United States Patent [19]

Aul

[11] Patent Number: 5,359,810
[45] Date of Patent: Nov. 1, 1994

[54] PROTECTIVE SHROUD FOR NURSERY STOCK

[76] Inventor: Debbie J. Aul, 3704 Love Rd., Darlington, Md. 21034

[21] Appl. No.: 139,719
[22] Filed: Oct. 22, 1993
[51] Int. Cl.⁵ ............................................. A01G 13/00
[52] U.S. Cl. ........................................ 47/84; 206/423
[58] Field of Search .............. 47/76, 84, 31; 150/154; 206/423

[56] References Cited

U.S. PATENT DOCUMENTS

| 857,435 | 6/1907 | Bell | 150/154 |
| 1,736,383 | 11/1929 | Waggoner | 150/154 |
| 1,988,886 | 1/1935 | Wilson | 47/84 |
| 2,781,811 | 2/1957 | Dilar et al. | 206/423 |
| 2,850,842 | 9/1958 | Eubank, Jr. | 47/76 |
| 3,038,558 | 6/1962 | Plummer | 150/154 |
| 3,249,140 | 5/1966 | Jackson | 47/84 |
| 3,550,662 | 12/1970 | Remke | 47/76 |
| 3,634,970 | 1/1972 | Williams | 47/76 |
| 4,054,166 | 10/1977 | Burke | 206/423 |
| 4,384,604 | 5/1983 | DeLaura et al. | 206/423 |
| 4,646,470 | 3/1987 | Maggio | 47/76 |
| 5,016,388 | 5/1991 | Burress et al. | 47/21 |
| 5,022,572 | 6/1991 | Brown | 150/154 |
| 5,233,788 | 8/1993 | Jackson, Jr. | 47/31 |

FOREIGN PATENT DOCUMENTS 885412  8/1942  France .................. 150/154

Primary Examiner—Ramon S. Britts
Assistant Examiner—Joanne C. Downs
Attorney, Agent, or Firm—Walter G. Finch

[57] ABSTRACT

The present invention provides a protective shroud or cover for young trees or shrubberies. The shroud envelopes the tree via a zipper fastener and firmly secures itself thereon by means of two drawstrings and a fastening strip. The shroud consists of an essentially oval-shaped, protective fabric portion, a zipper fastener disposed on opposing side edges of the fabric portion, two drawstrings, and a lower fastening strip which can be constructed from Velcro.

3 Claims, 1 Drawing Sheet

5,359,810

PROTECTIVE SHROUD FOR NURSERY STOCK

BACKGROUND OF THE INVENTION

This invention relates to young trees and shrubberies, and more particularly, to a shroud for covering and protecting such plants from the elements.

In the nursery industry, it is common practice to transport large quantities of young trees, shrubberies, and other plants to and from different locations. Often times, however, these young plants become damaged in the course of being moved because they are subjected to harsh elements such as high wind speeds and frigid temperatures. It is also fairly common to have a number of the branches of the young plants inadvertently broken-off while they are being moved. While some plants become damaged and only lose their vigor temporarily, others die as a result of the harm that they sustain during transport.

BEST KNOWN PRIOR ART

The best known prior U.S. art is as follows:
U.S. Pat. No. 4,646,467
U.S. Pat. No. 4,969,555
U.S. Pat. No. 5,016,388

The U.S. Pat. No. 4,969,555 issued to Fitzgerald discloses a tree branch corset made from a piece of fabric material, the fabric having a number of sets of mating fasteners attached along opposing side edges. A second embodiment of the Fitzgerald corset is funnel shaped and includes both mating fasteners along opposing side edges and a waistband section having a plurality of clips attached thereon.

The Morrisroe U.S. Pat. No. 4,646,467 teaches a weather resistant cover bag for dormant plants which is constructed from multiple layers of nonwoven, spunbonded textile fabrics. Air space is provided in between the layers which allow air and vapor to breathe through but remain impervious to rain, snow, ice, and strong wind blasts. A drawstring is provided for closing the mouth of the bag.

The U.S. Pat. No. 5,016,388 issued to Burress et al describes a protective tree guard which is made from stretch polymeric filaments and which has cooperative snap fasteners to facilitate securement of the guard about a tree. The flexible guard also has drawstrings at its upper and lower ends.

The present invention seeks to provide a protective shroud or cover for a young tree or shrubbery. The shroud envelopes the tree via a zipper fastener, and firmly secures itself thereon by means of two drawstrings and a Velcro strip.

OBJECTS OF THE INVENTION

It is an object of this invention to provide a protective cover or shroud for young nursery plants, the shroud made from a strong fabric material.

Another object of this invention is to provide a protective shroud for young plants which has a zipper fastener, two drawstrings, and a lower fastening strip.

And to provide a protective plant cover or shroud that is simple in design and dependable in operational use is still another object of this invention.

BRIEF DESCRIPTION OF THE DRAWINGS

These and other objects and attendant advantages of this invention will become more obvious and understood from the following detailed specification and accompanying drawings, in which.

DESCRIPTION OF THE PREFERRED EMBODIMENTS OF THE INVENTION

Figure 1:
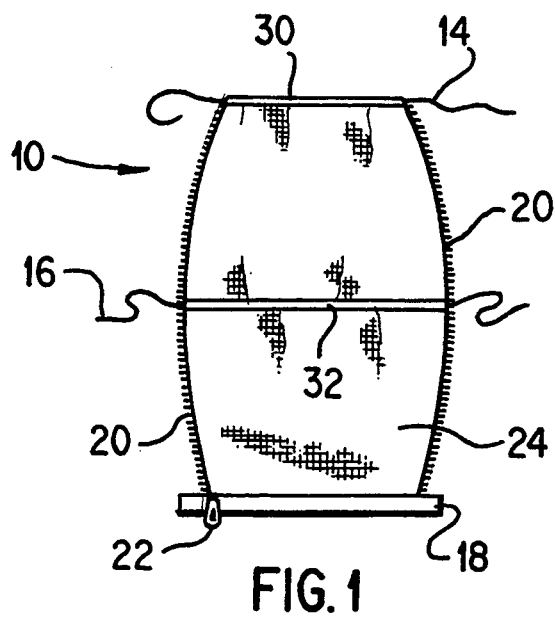
FIG. 1 is an elevational view of a protective shroud for nursery plants, the shroud incorporating novel features of this invention.
Figure 2:
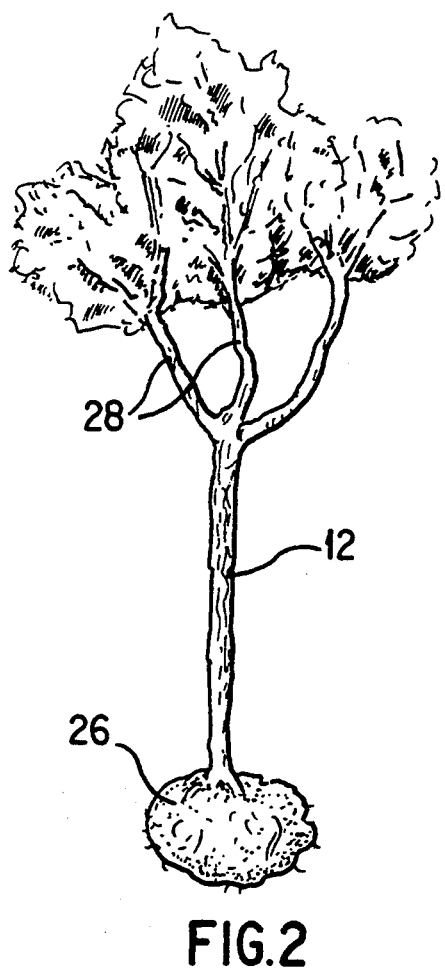
FIG. 2 is an elevational view of a young nursery tree.
Figure 3:
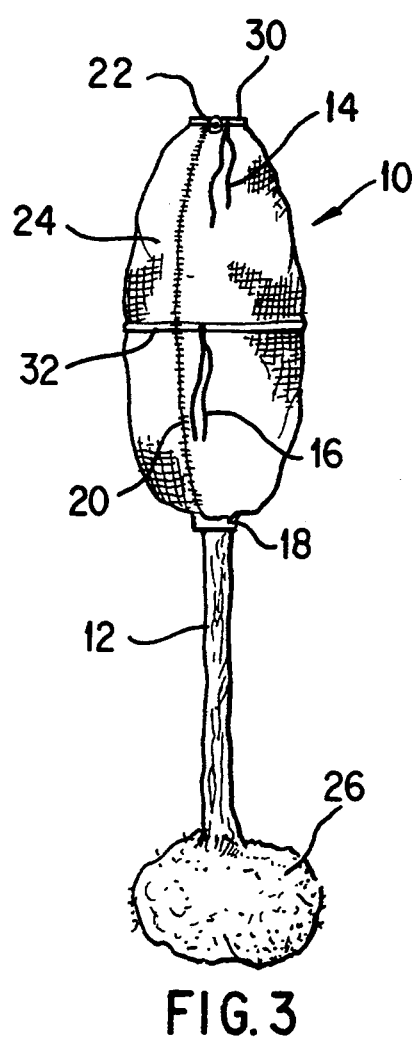
FIG. 3 is an elevational view of the shroud of FIG. 1 zippered around the branch portion of the tree of FIG. 2.

Referring now to FIGS. 1 to 3 of the drawings, there is shown the preferred embodiment of a protective shroud 10 embodying novel principles of this invention. The shroud 10 consists of an essentially oval-shaped, protective fabric portion 24, a zipper fastener 20 disposed on opposing side edges of the fabric portion 24, two drawstrings 14 and 16, and a lower fastening strip 18.

The view presented in FIG. 1 illustrates the shroud 10 in an unzippered, flat position. The shape of the shroud 10 is that of a flat oval, except for the truncated upper and lower end portions which are straight. A zipper fastener 20 is attached to the opposing side edges of the shroud 10 for enveloping the shroud 10 around a young tree or shrubbery. An upper drawstring 14 contained within a horizontally disposed upper sheath 30, a middle drawstring 16 contained within a horizontally disposed middle sheath 32, and a lower fastening strip 18 are provided for securing the shroud 10 tightly and uniformly to the vulnerable branches of a young tree or shrubbery.

FIG. 2 shows a typical young nursery tree 12. The tree 12 has a root ball portion 26 at its base and a number of branches 28 at its top.

FIG. 3 illustrates the placement of the shroud 10 around the branches 28 of the young tree 12 of FIG. 2. Securement of the shroud 10 around the tree 12 begins as the lower fastening strip 18 is wrapped around the trunk of the young tree 12 just below the base of the branches 28. The lower fastening strip 18 is designed with flap portions which wrap around and grip the strip 18 via fastening clasps, hooks, or other suitable fastening means. Preferably, the lower fastening strip 18 has Velcro grasping surfaces for quick and easy fastening.

Once the lower fastening strip 18 is secured, the zipper 20 joins the opposing side edges of the shroud 10 as the zipper tab 22 is pulled in an upward fashion. During zippering, the branches 28 of the tree 12 will need to be compressed together a certain amount. This is advantageous since the branches 28 will inevitably be partially immobilized in the shroud 10 during transport and therefore less susceptible to a tearing or breaking type of injury. Once the shroud 10 is zippered, the upper drawstring 14 may be tightened to close the top portion of the shroud 10. Similarly, the middle drawstring 16 may also be tightened a certain degree in order to appropriately compress the branches 28 further if needed.

The protective fabric portion 24 of the shroud protects the branches of the tree 12 from damage resulting from wind, snow, ice, etc. It has been discovered that a durable type of fabric, manufactured by Du Pont under the trademark TYVEK (1658R), is suitable for the protective fabric portion 24 of the shroud 10. The TYVEK material has ability to remain impervious to strong winds, rain, and snow while preventing "suffocation" of the tree 12 by allowing air and moisture to pass through to the branches 28.

It will be noted that since nursery stock is varied in size and shapes, certain size shrouds 10 will be suitable for certain trees and shrubberies but not for others. Accordingly, the shroud 10 may be made in sizes and proportions suitable for the specific application.

It should be clear that the invention is not limited to the previous descriptions and drawings, which merely illustrate the preferred embodiment. Slight departures may be made within the present scope of the invention. Therefore, the scope of the invention is meant to embrace any and all equivalent apparatus, as well as all design alterations, included in the appended claims.

What is claimed is:

1. A protective shroud for use in the transportation of nursery stock, said shroud comprising:
    an essentially oval-shaped protective permeable fabric cover, said fabric cover having an upper portion, a middle portion, a lower portion, and two opposing side edges;
    zipper means disposed on said opposing side edges of said fabric cover;
    a first drawstring means disposed on said upper portion of said fabric cover;
    a second drawstring means disposed on said middle portion of said fabric cover; and
    reuseable fastening strip means disposed on said lower portion of said fabric cover for detachably securing said opposing side edges of said lower portion around the nursery stock.

2. A protective shroud for use in the transportation of nursery stock, said shroud comprising a protective permeable fabric cover, said fabric cover having an upper portion, a middle portion, a lower portion, and two opposing side edges, said shroud further comprising zipper means disposed on said opposing side edges of said fabric cover, a first drawstring means disposed on said upper portion of said fabric cover, a second drawstring means disposed on said middle portion of said fabric cover, and reusable fastening strip means disposed on said lower portion of said fabric cover for detachably securing said opposing side edges of said lower portion around the nursery stock.

3. A protective shroud for use in the transportation of nursery stock, said shroud comprising a protective permeable fabric cover, said fabric cover having an upper portion, a middle portion, a lower portion, and two opposing side edges, said shroud further comprising a zipper fastener on said opposing side edges of said fabric cover, a first drawstring contained within a first sheath on said upper portion of said fabric cover, a second drawstring contained within a second sheath on said middle portion of said fabric cover, and a reusable fastening strip disposed on said lower portion of said fabric cover for detachably securing said opposing side edges of said lower portion around the nursery stock.

* * * * *

UNITED STATES PATENT AND TRADEMARK OFFICE
CERTIFICATE OF CORRECTION

PATENT NO. : 5,359,810
DATED : November 1, 1994
INVENTOR(S) : Debbie J. Aul

It is certified that error appears in the above-indentified patent and that said Letters Patent is hereby corrected as shown below: Title page: item [76]:

Inventor:, delete "Aul" and Insert --Blackburn--;

Col. 2, line 23, delete "fiat" and insert --flat--;

Col. 2, line 24, delete "fiat" and insert --flat--;

Signed and Sealed this

Third Day of January, 1995

Attest:

BRUCE LEHMAN

*Attesting Officer*          *Commissioner of Patents and Trademarks*